(12) United States Patent
Jiang et al.

(10) Patent No.: US 6,940,688 B2
(45) Date of Patent: Sep. 6, 2005

(54) COIL INDUCTIVE WRITER HAVING A LOW INDUCTANCE AND SHORT YOKE LENGTH

(75) Inventors: Hai Jiang, Fremont, CA (US); Yingjian Chen, Fremont, CA (US); Xiaozhong Dang, Fremont, CA (US); James Wang, Milpitas, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 244 days.

(21) Appl. No.: 10/277,463

(22) Filed: Oct. 21, 2002

(65) Prior Publication Data

US 2004/0075943 A1 Apr. 22, 2004

(51) Int. Cl.⁷ .............................................. G11B 5/147
(52) U.S. Cl. ...................................................... 360/123
(58) Field of Search ................................ 360/123, 317, 360/126; 29/603.14; 438/3

(56) References Cited

U.S. PATENT DOCUMENTS

| | | | |
|---|---|---|---|
| 5,995,342 A | * 11/1999 | Cohen et al. | ............... 360/126 |
| 6,195,232 B1 | 2/2001 | Cohen | |
| 6,381,094 B1 | * 4/2002 | Gill | ............................. 360/126 |
| 6,513,228 B1 | * 2/2003 | Khizroev et al. | ........ 29/603.14 |
| 6,665,142 B2 | * 12/2003 | Yoshida et al. | ............. 360/123 |
| 6,673,633 B2 | * 1/2004 | Sasaki | ........................... 438/3 |

OTHER PUBLICATIONS

A Design Concept of Array Heads, D.D. Tang, H. Santini, R.E. Lee, K. Ju and M. Krounbi, IEEE Transactions on Magnetics, vol. 33, No. 3, May 1997.

Design of Magnetic Inductive Write Heads for High–Density Storage, Masson L. Williams and Edward Grochowski, IBM Almaden Research Center, San Jose, CA, USA.

* cited by examiner

Primary Examiner—Tianjie Chen
(74) Attorney, Agent, or Firm—Joshua C. Harrison, Esq.; Sawyer Law Group

(57) ABSTRACT

A method and system for providing a thin film recording head are disclosed. The method and system include providing a first pole, providing a second pole and providing a write gap separating the first pole from the second pole. The method and system further include providing at least one coil having a plurality of turns. A portion of each of the plurality of turns is between the first and the second pole. The plurality of turns wind around the second pole.

16 Claims, 7 Drawing Sheets

COIL INDUCTIVE WRITER HAVING A LOW INDUCTANCE AND SHORT YOKE LENGTH

FIELD OF THE INVENTION

The present invention relates to magnetic recording systems, and more particularly to a method and system for providing a solenoid coil writer having a short yoke length and a low inductance.

BACKGROUND OF THE INVENTION

Thin film recording heads are currently used for writing data to recording media. Thin film heads include features, such as the coil, that are fabricated using thin film techniques. Thin film heads are often part of a merged head, which also includes a read head. For example, FIGS. 1A and 1B depict a conventional thin film recording head 10. The conventional thin film recording head 10 includes a first pole 12 and a second pole 18 separated by a write gap 14. The first pole 12 typically includes a bottom portion 11 and a pedestal 13. The conventional thin film recording head 10 also includes a conventional coil 16 surrounded by insulator 20, which is typically fabricated in multiple steps. The conventional coil 16 is known as a pancake coil because the conventional coil 16 is planar in nature. Thus, the conventional coil 16 in its entirety resides between the first pole 12 and the second pole 18.

FIG. 2 depicts a high-level flow chart of a conventional method 30 for forming the conventional thin film recording head 10. The bottom pole 12 is formed, via step 32. The pedestal 13 is formed, via step 34. Typically, step 34 includes providing a resist structure, electroplating the ferromagnetic pedestal 13, then backfilling the conventional thin film recording head 10 with an insulator, such as alumina. The conventional coil 16 is provided, via step 36. Step 36 typically include providing a resist structure with apertures where the turns of the conventional coil 16 are to be formed, then providing a layer of conductive material. For example, step 36 could include electroplating a conductive material such as copper. The conventional coil 16 is thus planar. The conventional coil 16 is insulated, via step 38. Typically, step 38 is accomplished by providing a layer of cured photoresist. The second pole is fabricated, via step 40. Like the first pole 12, the second pole is typically a ferromagnetic material.

Although the conventional thin film recording head 10 functions, one of ordinary skill in the art will readily recognize that the conventional thin film recording head 10 may be unable to write to higher density recording media at the desired data rate. As the density of recording media increases, the data rate at which the information is written also increases. Consequently, the conventional thin film recording head 10 must have a short yoke length for the poles 12 and 18 and a low inductance. It is known that a conventional solenoid recording head, in which wire is wrapped around one of the poles, generally has a smaller inductance because the coil is smaller. However, the conventional thin film recording head 10 has a relatively high inductance because the conventional coil 16 has a relatively large diameter. In addition, the conventional coil 16 does not efficiently magnetically couple to the poles 12 and 18. As a result, more turns are required for the conventional coil 16 to provide the desired magnetic field in the write gap 14. Consequently, the length of the yoke for the poles 14 and 18 must have a length that is sufficient to accommodate the additional turns of the conventional coil 16. The yoke for the conventional thin film recording head 10 may, therefore, be longer than desired for high density recording applications. Thus, the conventional thin film recording head 10 may have a yoke that is longer and an inductance that is higher than desired for high density recording.

Accordingly, what is needed is a system and method for providing a thin film recording head which is suitable for use in high density recording. The present invention addresses such a need.

SUMMARY OF THE INVENTION

The present invention provides a method and system for providing a thin film recording head are disclosed. The method and system comprise providing a first pole, providing a second pole and providing a write gap separating the first pole from the second pole. The method and system further comprise providing at least one coil having a plurality of turns. A portion of each of the plurality of turns is between the first and the second pole. The plurality of turns wind around the second pole.

According to the system and method disclosed herein, the present invention provides a thin film recording head having improved efficiency and speed.

DETAILED DESCRIPTION OF THE INVENTION

The present invention relates to an improvement in magnetic recording technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a thin film recording head are disclosed. The method and system comprise providing a first pole, providing a second pole and providing a write gap separating the first pole from the second pole. The method and system further comprise providing at least one coil having a plurality of turns. A portion of each of the plurality of turns is between the first and the second pole. The plurality of turns wind around the second pole.

The present invention will be described in terms of a thin film recoding head. However, one of ordinary skill in the art will readily recognize that the recording head is generally part of a merged head including both a thin film read head and a recording head. The present invention will also be described in the context of a thin film recording head having particular components with a certain configuration. However, one of ordinary skill in the art will readily recognize that this method and system will operate effectively for other thin film recording heads having other and/or additional components with a different configuration not inconsistent with the present invention.

Figure 3:
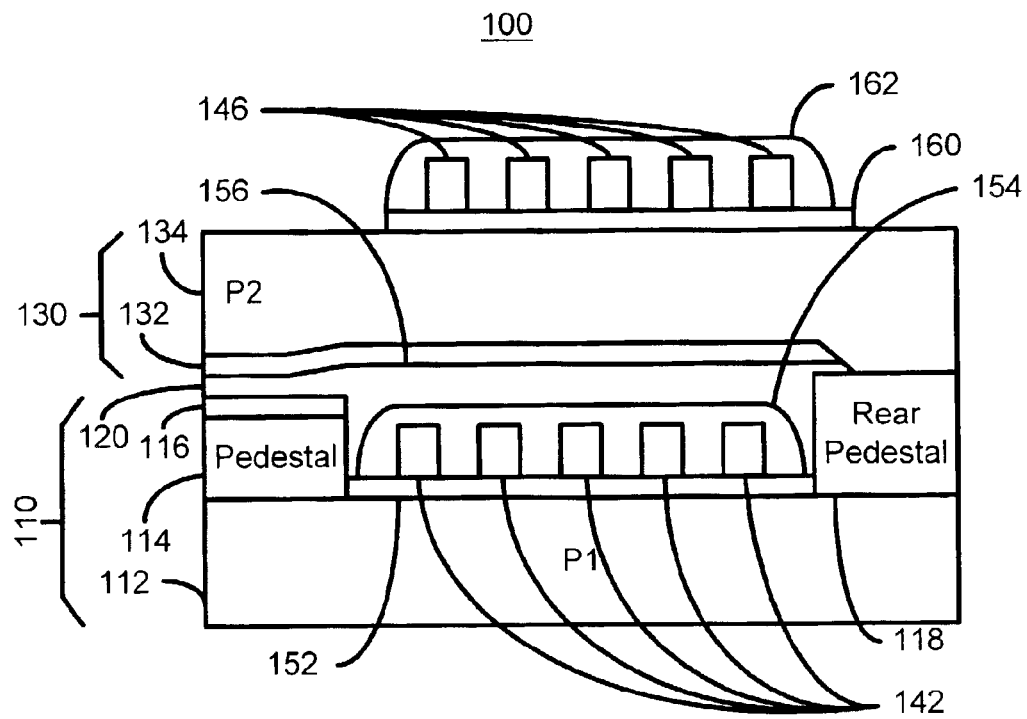
FIG. 3 is a side view of one embodiment of a thin film recording head in accordance with the present invention.
Figure 4:
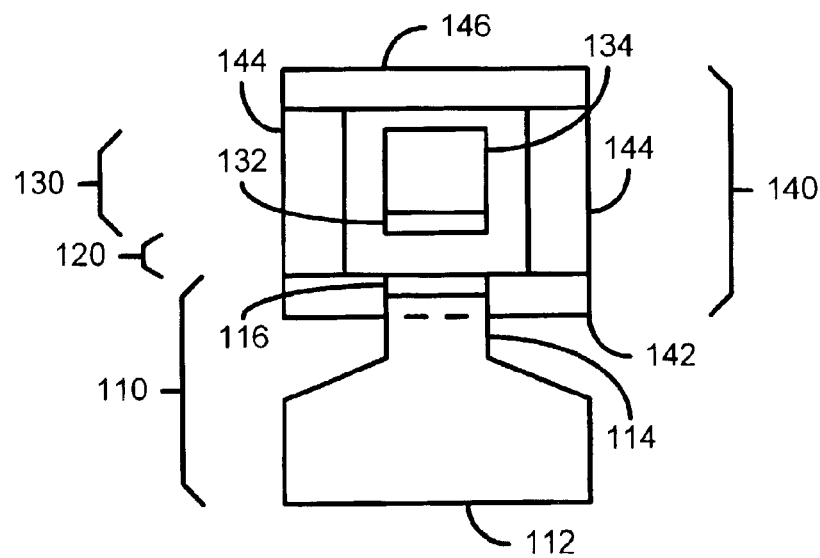
FIG. 4 is a cross-sectional view of a portion of one embodiment of the thin film recording head in accordance with the present invention.

To more particularly illustrate the method and system in accordance with the present invention, refer now to FIGS. 3 and 4, depicting one embodiment of a thin film recording head 100 in accordance with the present invention. FIG. 3 depicts a side view of the thin film recording head 100. FIG. 4 depicts the thin film recording head 100 from the air bearing surface. Referring to FIGS. 3 and 4, the thin film recording head 100 is formed using thin film techniques. Consequently, the components of the thin film recording head 100 are, in general, formed in layers using thin film techniques such as sputtering, electroplating, ion beam etching, and reactive ion etching. The thin film recording head 100 includes a first pole (P1) 110, a write gap 120, a second pole (P2) 130, a coil 140 and insulators 150, which includes insulators 152, 154 and 156, described below, as well as insulators 160 and 162 above the P2 130. The insulators 150 are preferably formed in layers: a first layer 152 below the bottom portion 142 of the coils 140, a layer 154 around the bottom portion 142 of the coils 140 and an upper layer 156. The layers 152 and 156 are preferably sputtered alumina. The layer 154 is preferably cured photoresist. The insulation 160 and 162, which surround the pad portion 144 and reside above the P2 130, respectively, are preferably alumina while the insulation 162 is preferably cured photoresist.

The poles P1 110 and P2 130 are ferromagnetic and composed of materials such as NiFe. The P1 110 includes a bottom portion 112 and a pedestal 114. The P1 110 may also include a high moment seed layer 116, which is preferably sputtered. Also included is a rear pedestal 118 which connects the rear portions of the P1 110 and P2 130. The write gap 120 separates P1 110 from P2 130 in the region where a magnetic field that is used to write to the media (not shown) is developed. The write gap is typically an insulator. The P2 130 preferably includes a high moment seed layer 132 and a top portion 134. However, in an alternate embodiment, the seed layers 116 and/or 132 may be omitted. The seed layers may include materials such as CoFeN or FeXN where X includes Rh, Al, Ta, Zr, Ti or similar materials.

Figure 1A:
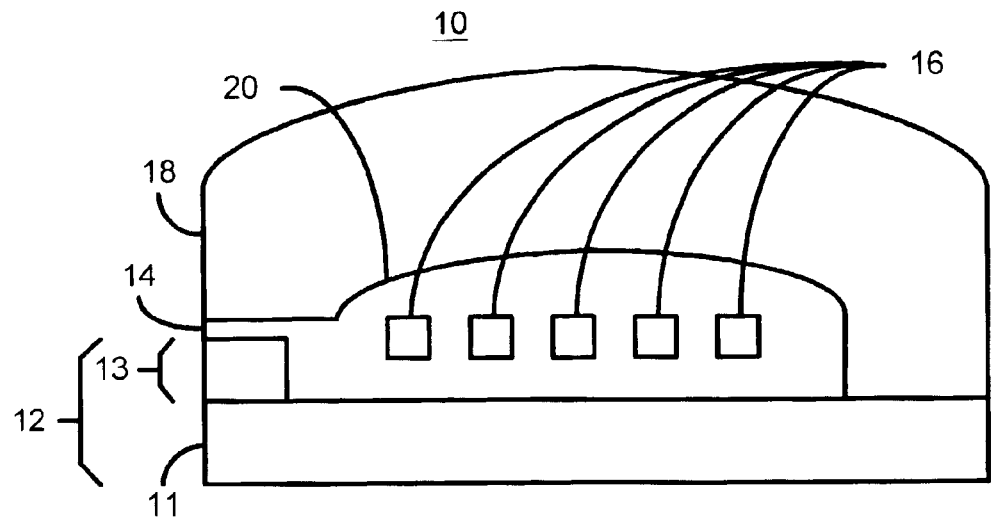
FIG. 1A is a side view of a conventional thin film recording head.
Figure 1B:
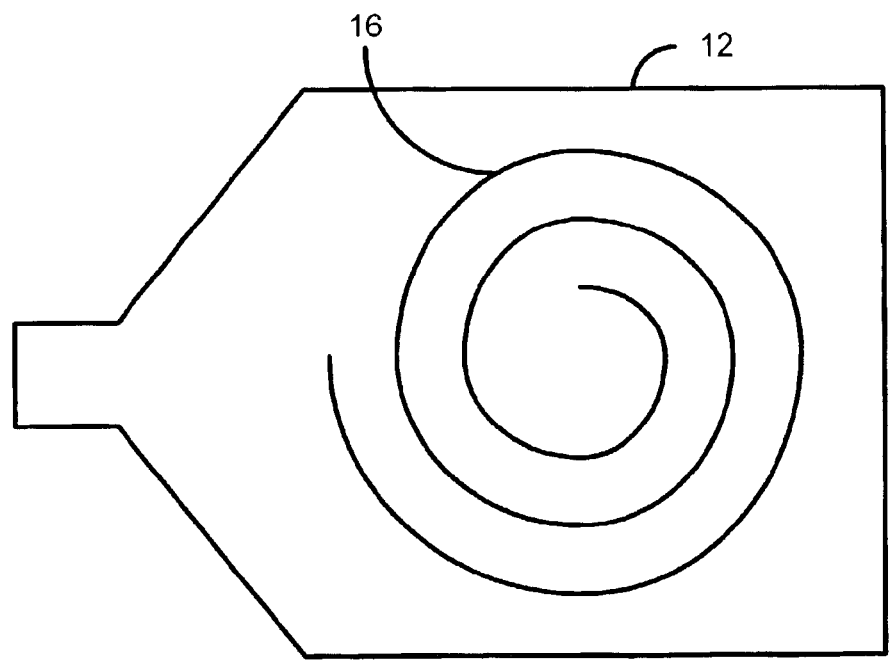
FIG. 1B is a top view of a conventional thin film recording head.
Figure 2:
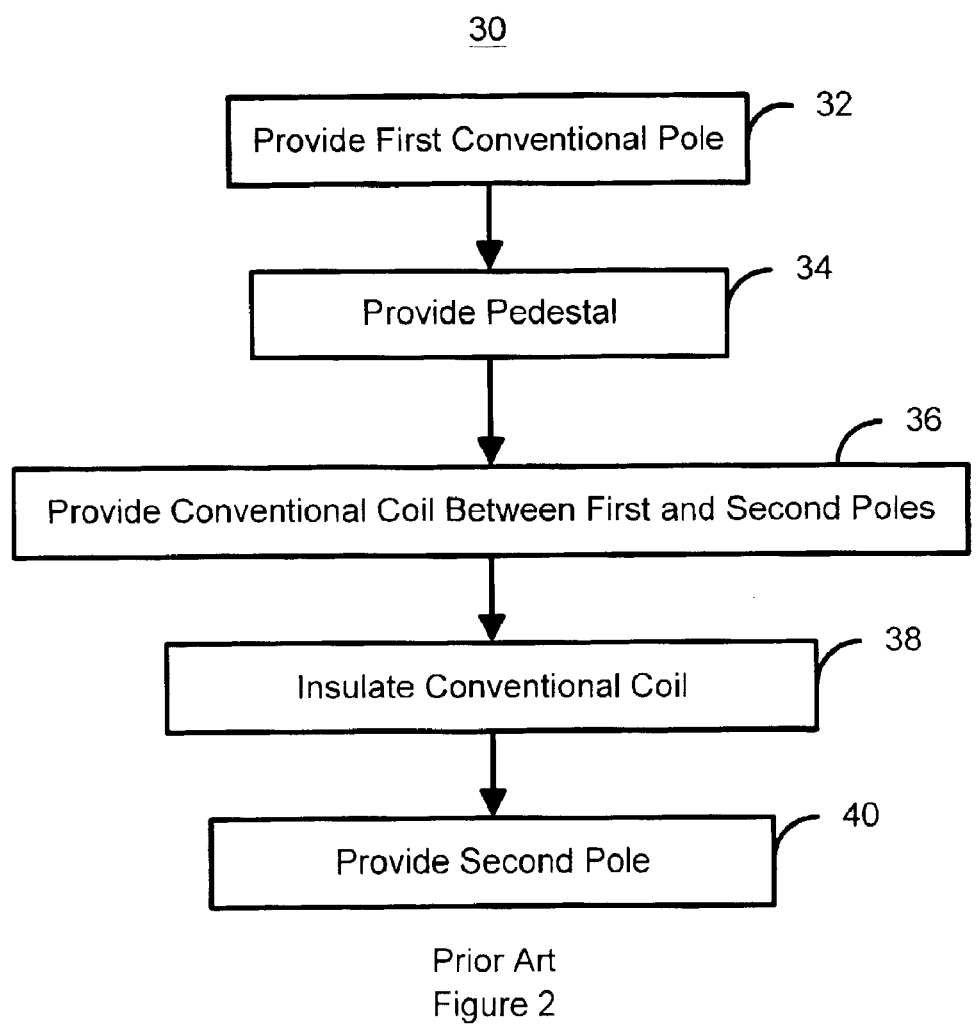
FIG. 2 is a flow chart depicting a conventional method for booting using a sub-partition in a partition that is transparent to the operating system.

The thin film recording head 100 also includes one or more coils. A single coil 140 is depicted in FIGS. 1A and 1B. A portion of the coil 140 resides between the P1 110 and P2 130. A portion of the coil 140 also resides above and outside of P2 130. Thus, the coil 140 surrounds a portion of the P2 130. The coil 140 includes a plurality of turns which wind around the P2 130. Thus, the thin film recording head 100 can be considered to be a solenoidal thin film head. The coil 140 includes a bottom portion 142, a pad portion 144 and a top portion 146. The pad portion 144 electrically connects the bottom portion 142 and the top portion 146 of the coil 140. The bottom portion 142 and the top portion 146 of the coil 140 are essentially bars of conductive material. The top portion 146 and bottom portion 142 are preferably made of a nonmagnetic material such as copper. The pad portion 144 is preferably a magnetic material, such as NiFe. The pads for the pad portion 144 are preferably configured to allow individual pads to be electrically isolated. At the same time, the pads of the pad portion 144 connect the one of the bars of the bottom portion 142 with one of the bars of the top portion 146. The pad portion 144 connects bars in the bottom portion 142 to bars in the top portion 146 such that the coil 140 winds around P2 130. In a preferred embodiment, the pads are approximately $2 \times 3$ $\mu m^2$ at a distance of 0.3–0.4 $\mu m$ apart. However, in an alternate embodiment, pads having a different size and/or spacing may be used. The turns of the coil 140 preferably have a pitch of 1.5 $\mu m$, with each turn having a width of 1.0 $\mu m$ and a spacing of 0.5 $\mu m$ between coils. The number of turns for the coil 140 is preferably between two and six. Consequently, the yoke length for the thin film recording head 100 is preferably between five and fourteen $\mu m$. In addition, the coil 140 may have an inductance as low as 1.1 nH.

Because the coil 140 is oriented around the P2 130 in a solenoid fashion, instead of residing between the P1 110 and P2 130, the current in the coil 140 magnetically couples to the P2 140 more efficiently. In particular, each turn of the coil 140 contributes to the magnetic force through the P2 130 because the entire turn is around the P2 130. This is in contrast to the conventional coil 16 depicted in FIG. 1, which does not wind around either pole. Referring back to FIGS. 3 and 4, the thin film recording head 100 thus has better performance than a conventional thin film recording head 10 using a conventional coil 16 having the same number of turns and carrying the same current. Moreover, because of the orientation of the coil 140, the yoke of the thin film recording head 100 may be shortened. In addition to the efficiency of the coupling between the coil 140 and P2 130, the thin film recording head 100 also has a reduced inductance. As a result, the thin film recording head 100 can operate at a higher data rate. The thin film recording head 100 can, therefore, be used with higher density recording media.

Figure 5:
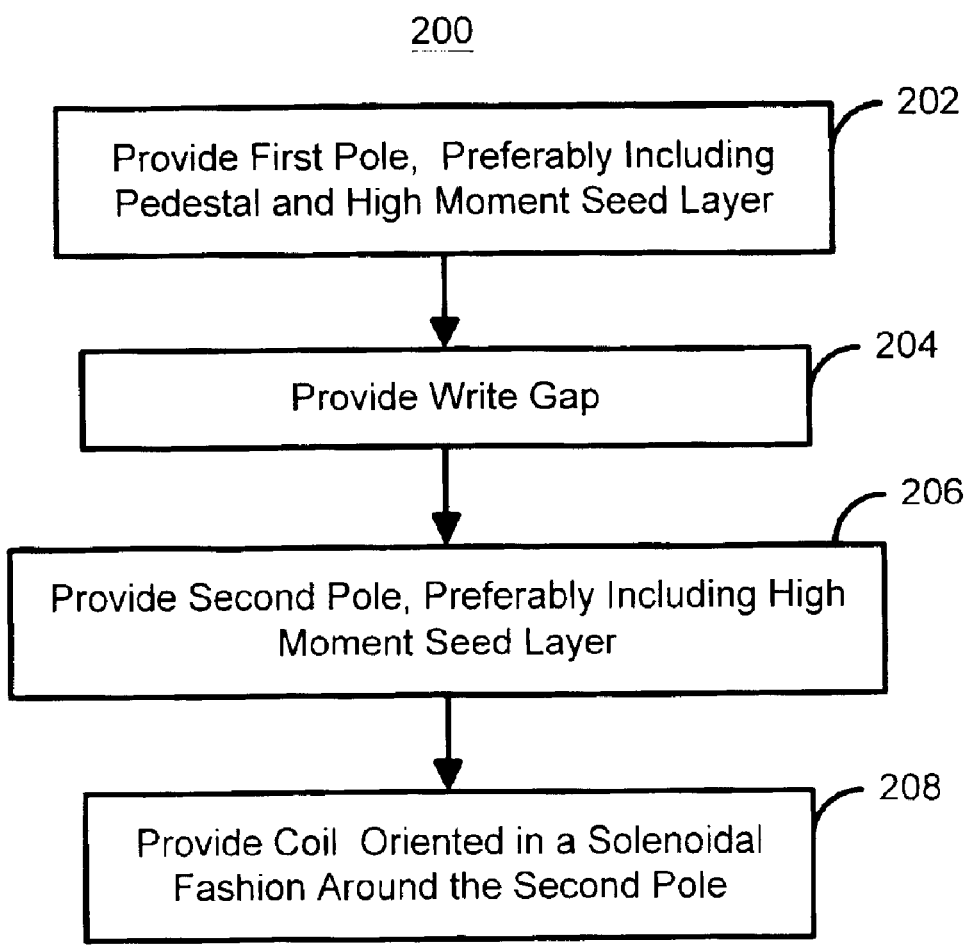
FIG. 5 is a high-level flow chart depicting one embodiment of a method in accordance with the present invention for providing a thin film recording head in accordance with the present invention.

FIG. 5 is a high-level flow chart depicting one embodiment of a method 200 in accordance with the present invention for providing a thin film recording head in accordance with the present invention. The method 200 is described in conjunction with the thin film recording head 100. For clarity, certain steps are omitted. In addition, the steps shown in the method are generally not sequential. The P1 110 is provided, via step 202. Step 202 includes electroplating magnetic material for the bottom portion 112 and providing the pedestal 114. In a preferred embodiment, step 202 also includes providing the high moment seed layer 116. The write gap 120 is provided, via step 204. The P2 130 is provided, via step 206. The coil(s) 140 are provided, via step 208. The coil(s) 140 provided in step 208 wind around the P2 130. In one embodiment, discussed below, portions of the pad portion 144 are provided with the pedestal 114 and with the P2 130. In an alternate embodiment, the pad portion 144 is provided separately, allowing a lower resistance material such as copper to be used for the pad portion 144. Consequently, the thin film recording head 100, having the benefits discussed above, is formed.

Figure 6:
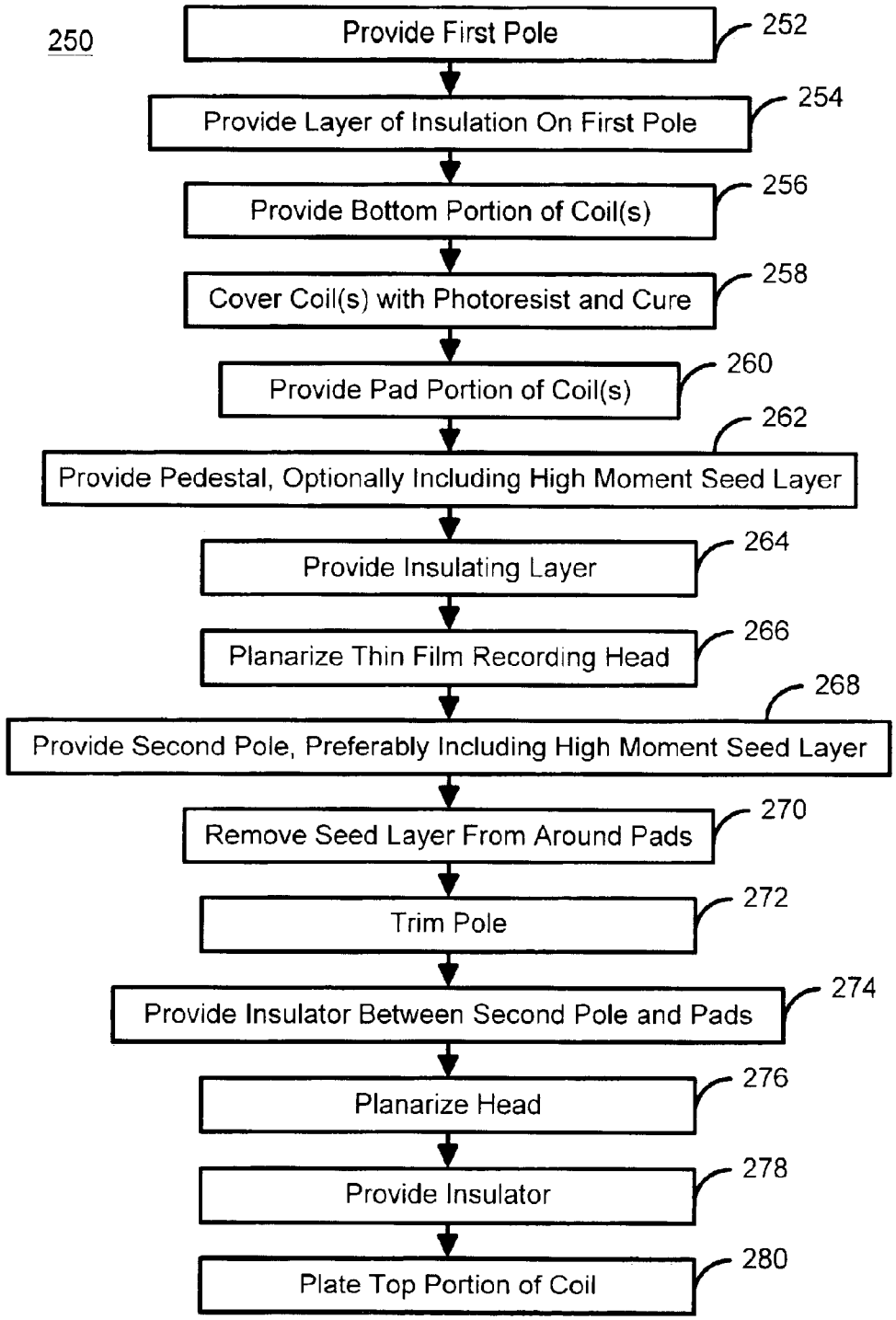
FIG. 6 is a more detailed flow chart depicting one embodiment of a method in accordance with the present invention for providing a thin film recording head in accordance with the present invention.

FIG. 6 is a more detailed flow chart depicting one embodiment of a method 250 in accordance with the present invention for providing a thin film recording head in accordance with the present invention. The method 250 is described in the context of the thin film recording head 100. In addition, the method 250 is also described in conjunction with FIGS. 7A–7D, which depict plan views of one embodiment of a thin film recording head 100 in accordance with the present invention during fabrication. The method 250 omits certain steps for clarity. In addition, although only one coil having a certain number of turns is described, the present invention is consistent with the use of multiple coils having another number of turns.

The P1 110 is plated, via step 252. Step 252 includes forming the bottom portion 112 of the P1 110. A layer of insulation 152 is provided on the bottom portion 112 of the P1 110, via step 254. Step 254 is performed to insulate the coil 140 from the bottom portion 112 of the P1 110. Step 254 preferably includes sputtering a layer of $Al_2O_3$ on the bottom portion 112 of the P1 110.

Figure 7A:
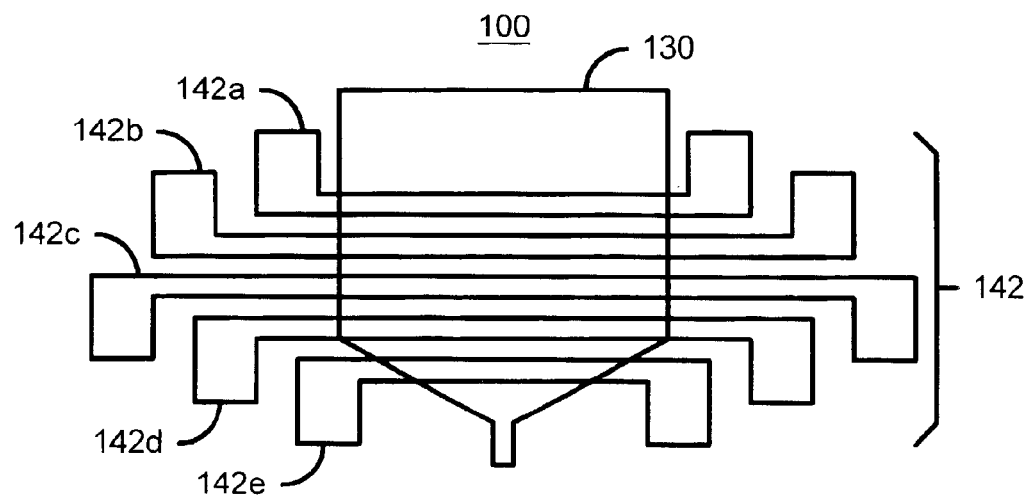
FIGS. 7A–7D depict plan views of one embodiment of a thin film recording head in accordance with the present invention during fabrication.

The bottom portion 142 of the coils 140 is fabricated, via step 256. Step 256 preferably includes electroplating copper bars onto the thin film recording head 100. FIG. 7A depicts the thin film recording head 100 after formation of the bottom portion 142 of the coils 140. The bottom portion 142 includes bars 142a, 142b, 142c, 142d, and 142e. A bar 142a, 142b, 142c, 142d and 142e is provided for each turn of the coil. The ends of the bars 142a, 142b, 142c, 142d and 142e are formed in the shape of pads so that that the pad portion 144 can connect to the bottom portion 142 of the coil 140. In a preferred embodiment, the bars 142a, 142b, 142c, 142d and 142e have a width of approximately 1.0 μm and a spacing of 0.5 μm for a pitch of 1.5 μm.

Once the bottom portion 142 of the coil 140 has been formed, a layer of photoresist is provided on the coil 140 and cured to insulate the coil 140, via step 258. Thus, the insulating layer 154 is formed. The pad portion 144 of the coil is fabricated, via step 260. Step 260 preferably includes providing a layer of resist having apertures in locations where the pads for the pad portion 144 are to be formed and plating the pads, preferably using NiFe. Step 260 also includes spacing the pads for the pad portion 144 such that subsequent steps, such as removal of the high moment seed layer and filling of the spaces with an insulator, are facilitated. In addition, the pads formed in step 260 are large enough to ensure that the resistance of the pads is low enough to be close to that of the bottom portion 142 and the top portion 146 of the coil 140. In a preferred embodiment, each of the pads is approximately 2×3 μm. The pedestal 114 and rear pedestal 118 are formed, via step 262. Step 262 preferably also includes sputtering the high moment layer 116. An insulating layer is provided, via step 264. In a preferred embodiment, step 264 includes sputtering a layer of alumina in order to provide a write gap. The thin film recording head 100 is planarized, via step 266. Step 26 is generally performed using a chemical mechanical polish ("CMP").

Figure 7B:
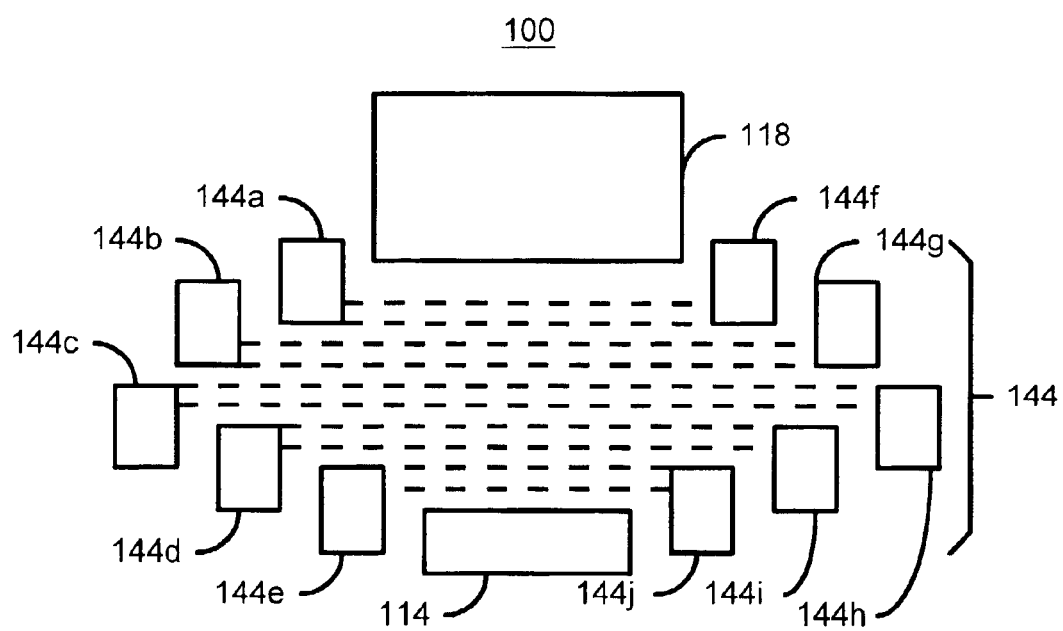

FIG. 7B depicts the thin film recording head 100 after the planarization step 266. The pad portion 144 includes pads 144a and 144f, 144b and 144g, 144c and 144h, 144d and 144i, and 144e which are electrically coupled with the bars 142a, 142b, 142c, 142d and 142e, respectively. Also depicted are the pedestal 114 and rear pedestal 118. Although ten pads 144a, 144b, 144c, 144d, 144e, 144f, 144g, 144h, 144i and 144j are depicted, in an alternate embodiment, having another number of bars 142a, 142b, 142c, 142d and 142e, another number of pads can be provided.

The P2 130 is provided, via step 268. Step 268 preferably includes providing the high moment seed layer 132. Although steps 260 (pad formation), 262 (pedestal formation) and 268 (P2 formation) are depicted as separate, in alternate embodiments, one portion of the pads 144a, 144b, 144c, 144d, 144e, 144f, 144g, 144h, 144i and 144j can be formed with the pedestal 114 and another portion with the P2 130, depending upon the design of the thin film head 100. If the pads 144a, 144b, 144c, 144d, 144e, 144f, 144g, 144h, 144i and 144j are fabricated separately, then a lower resistance material, such as copper, can be used.

In forming the P2 130, apertures in a resist structure reside above the P2 130, as well as above the pads 144a, 144b, 144c, 144d, 144e, 144f, 144g, 144h, 144i and 144j. As a result, some portion of the high moment seed layer 132 provided in step 268 also remains in region around and electrically connecting the pads 144a, 144b, 144c, 144d, 144e, 144f, 144g, 144h, 144i and 144j. Subsequently, the seed layer is removed from the region around the pads 144a, 144b, 144c, 144d, 144e, 144f, 144g, 144h, 144i and 144j, via step 270. In a preferred embodiment, an ion milling process is used in step 268 to remove the Seed layer from on and between the pads 144a, 144b, 144c, 144d, 144e, 144f, 144g, 144h, 144i and 144j. The thicknesses of the pads 144a, 144b, 144c, 144d, 144e, 144f, 144g, 144h, 144i and 144j and P2 130 is generally approximately three to four microns. Because the space between the pads 144a, 144b, 144c, 144d, 144e, 144f, 144g, 144h, 144i and 144j is relatively small, the milling performed in step 270 should thoroughly remove the seed layer to prevent the pads 144a, 144b, 144c, 144d, 144e, 144f, 144g, 144h, 144i and 144j without shorting the pads 144a, 144b, 144c, 144d, 144e, 144f, 144g, 144h, 144i and 144j. If the pads 144a, 144b, 144c, 144d, 144e, 144f, 144g, 144h, 144i and 144j are formed in a separate step, after formation of P2 130, a lower resistance material such as copper can be used.

A pole trim step is performed to shape the poles P1 110 and P2 130 and ensure that the poles 110 and 130 have the desired track width, via step 272. An insulator used to fill the spaces between the pads 144a, 144b, 144c, 144d, 144e, 144f, 144g, 144h, 144i and 144j and between the pad portion 144 and the P2 130, via step 274. In a preferred embodiment, step 274 includes RF sputtering $Al_2O_3$. Because of shadowing, the spaces between the pads 144a, 144b, 144c, 144d, 144e, 144f, 144g, 144h, 144i and 144j must be sufficient to allow the spaces to be filled without voids using an insulator. This spacing also depends upon the height/thickness of the pads 144a, 144b, 144c, 144d, 144e, 144f, 144g, 144h, 144i and 144j.

Figure 7C:
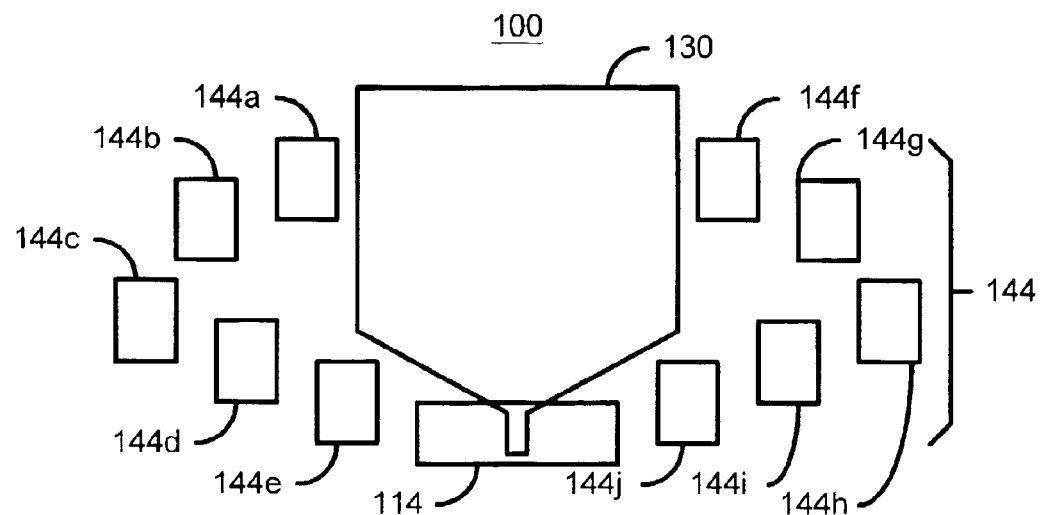

The thin film recording head 100 is then planarized, preferably using CMP, via step 276. The planarization step 276 is performed so that the top portion 146 of the coil 140 can be fabricated. FIG. 7C depicts the thin film recording head 100 after the planarization step 276.

Figure 7D:
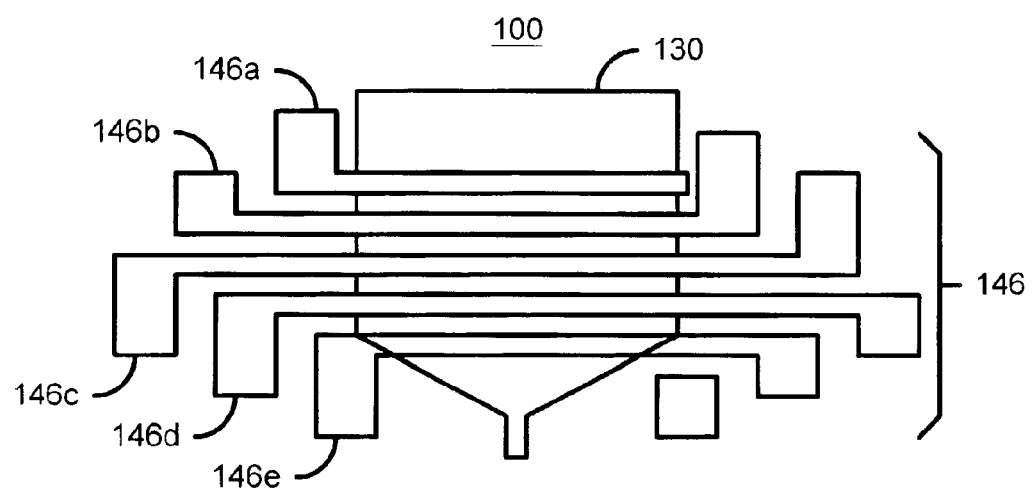

Another layer of insulator, preferably $Al_2O_3$, is deposited on the P2 130, via step 278. In a preferred embodiment, the $Al_2O_3$ layer is approximately 0.2 μm thick. The top portion 146 of the coil 140 is plated, via step 280. FIG. 7D depicts the top portion of the thin film recording head after step 280 has been performed. Consequently, the top portion 146 of the coil 140 has been formed. The top portion 146 includes conductive bars 146a, 146b, 146c, 146d and 146e. The conductive bars 146a, 146b, 146c and 146d are offset from the conductive bars 142a, 142b, 142c, 142d and 142e of the bottom portion 142 of the coil 140. The recording head may then be finished. For example, a layer of photoresist can be provided and cured to insulate the top portion 146 of the coil 140.

Thus, the method 200 and 250 can be used to provide the thin film recording head 100. The thin film recording head 100 includes the coil 140 that oriented as a solenoid around one of the poles 110 or 130. Thus, the coil 140 preferably includes a bottom portion 142 between the P1 110 and P2 130, a top portion 144 that lies outside of the P1 110 and P2 130, and a pad portion 144 connecting the top portion 144 and the bottom portion 142. As a result, the inductance and, in one embodiment, the resistance of the coil 140 is reduced. In addition, the coil 140 couples more efficiently with the P2 130. The thin film recording head 100 can thus have a shorter yoke. As a result, the thin film recording head 100 can be used to write to a higher density recording media and have a higher data rate. Moreover, in one embodiment, the thin film recording head 100 has a smaller field at the edges of the P1 110 and P2 130, thereby undesirable reducing side writing.

A method and system has been disclosed for a thin film recording head having improved efficiency, a shorter yoke and a lower inductance. The thin film head thus can write at higher densities with an improved data rate. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A thin film recording head comprising:
   a first pole;
   a second pole consisting of a group of materials;
   a write gap separating the first pole from the second pole; and
   at least one coil having a plurality of turns, a portion of each of the plurality of turns being between the first and the second pole, the plurality of turns around a portion of the second pole, the at least one coil further including
   a bottom portion residing between the first pole and the second pole, the bottom potion including a first plurality of conductive bars;
   a top portion residing above the second pole, the top portion including a second plurality of conductive bars; and
   a pad portion including a plurality of pads, the plurality of pads electrically connecting the bottom portion to the top portion, the pad portion comprising each and every one of the materials in the group.

2. The thin film recording head of claim 1 wherein the bottom portion and the top portion are nonmagnetic conductors.

3. The thin film recording head of claim 1 wherein the top portion is offset from the bottom portion such that the plurality of turns winds around the second pole.

4. The thin film recording head of claim 1 wherein the pad portion includes a nonmagnetic material.

5. The thin film recording head of claim 1 further comprising:
   an insulating layer between the at least one coil and the first pole.

6. The thin film recording head of claim 1 wherein the plurality of turns further have a coil pitch, the coil pitch being less than or equal to 1.5 $\mu$m.

7. The thin film recording head of claim 6 wherein the plurality of turns includes between two and six turns, wherein the plurality of turns have a pitch of 1.5 $\mu$m and wherein the second pole has a yoke length of between five and fourteen $\mu$m.

8. A thin film recording head comprising:
   a first pole;
   a second pole;
   a write gap separating the first pole from the second pole; and
   at least one coil having a plurality of turns, a portion of each of the plurality of turns being between the first and the second pole, the plurality of turns around a portion of the second pole, the at least of coil further including:
   a bottom portion residing between the first pole and the second pole, the bottom potion including a first plurality of conductive bars;
   a top portion residing above the second pole, the top portion including a second plurality of conductive bars; and
   a pad portion including a plurality of pads, the plurality of pads electrically connecting the bottom portion to the top portion, the pad portion including a magnetic material, wherein the magnetic material is NiFe.

9. A method for providing a thin film recording head comprising the steps of:
   (a) providing a first pole;
   (b) providing a second pole consisting of a group of materials;
   (c) providing a write gap above the pedestal of the first pole, the second portion of the first pole being adjacent to the write gap;
   (d) providing at least one coil having a plurality of turns, a portion of each of the plurality of turns being between the first and the second pole, the plurality of turns around the second pole, the step of providing the at least of coil (d) further includes the steps of:
   (d1) providing a bottom portion residing between the first pole and the second pole, the bottom potion including a first plurality of conductive bars;
   (d2) providing a pad portion including a plurality of pads, the plurality of pads comprising each and every one of the materials in the group; and
   (d3) providing a top portion residing above the second pole, the top portion including a second plurality of conductive bars, the plurality of pads electrically connecting the bottom portion to the top portion.

10. The method of claim 9 wherein the bottom portion and the top portion are nonmagnetic conductors.

11. The method of claim 9 wherein the top portion is offset from the bottom portion such that the plurality of turns winds around the second pole.

12. The method of claim 9 wherein the step of providing the pad portion (d2) includes the step of:
   (d2i) providing the plurality of pads composed of a nonmagnetic material.

13. The method of claim 9 further comprising the step of:
   (e) providing an insulating layer between the at least one coil and the first pole.

14. The method of claim 9 wherein the plurality of turns further have a coil pitch, the coil pitch being less than or equal to 1.5 $\mu$m.

15. The method of claim 14 wherein the plurality of turns includes between two and six turns, wherein the plurality of turns have a pitch of 1.5 $\mu$m and wherein the second pole has a yoke length of between five and fourteen $\mu$m.

16. A method for providing a thin film recording head comprising the steps of:

(a) providing a first pole;
(b) providing a second pole;
(c) providing a write gap above the pedestal of the first pole, the second portion of the first pole being adjacent to the write gap;
(d) providing at least one coil having a plurality of turns, a portion of each of the plurality of turns being between the first and the second pole, the plurality of turns around the second pole, the step of providing at least one coil further including
(d1) providing a bottom portion residing between the first pole and the second pole, the bottom potion including a first plurality of conductive bars;
(d2) providing a pad portion including a plurality of pads, wherein the step of providing the pad portion (d2) includes the step of:
(d2i) providing the plurality of pads composed of a magnetic material; and
(d3) providing a top portion residing above the second pole, the top portion including a second plurality of conductive bars, the plurality of pads electrically connecting the bottom portion to the top portion;

wherein the magnetic material is NiFe.

* * * * *

UNITED STATES PATENT AND TRADEMARK OFFICE
CERTIFICATE OF CORRECTION

| | | |
|---|---|---|
| PATENT NO. | : 6,940,688 B2 | Page 1 of 1 |
| APPLICATION NO. | : 10/277463 | |
| DATED | : September 6, 2005 | |
| INVENTOR(S) | : Jiang et al. | |

It is certified that error appears in the above-identified patent and that said Letters Patent is hereby corrected as shown below:

In column 8, line 11, Claim 8:

delete "of the second pole, the at least of coil further including:"

and insert

-- of the second pole, the at least one coil further including: --

Signed and Sealed this
Third Day of January, 2012

David J. Kappos
*Director of the United States Patent and Trademark Office*